Patented Nov. 1, 1949

2,486,811

UNITED STATES PATENT OFFICE 2,486,811

CERAMIC BODIES

Woldemar A. Weyl, State College, Pa., assignor to Monsanto Chemical Company, a corporation of Delaware No Drawing. Application January 27, 1941,
Serial No. 376,181

23 Claims. (Cl. 106—45)

This invention provides an electrical insulating composition of the porcelain type having improved electrical and mechanical properties.

Ceramic bodies of the porcelain type are usually made from three essential constituents:

1. Kaoline and clay ($Al_2O_3$, $SiO_2$, $H_2O$)
2. Flint ($SiO_2$)
3. Feldspar (potassium and sodium aluminum silicates).

The clay and flint together form the body of the ceramic mass and as this silica-alumina mixture has a very high sintering point, a flux is most generally added to form the matrix which bonds the particles together and also fills the voids in the mass producing a dense body of low porosity. The flux is usually feldspar which mineral always contains alkali. It has long been known that alkali metal compounds should preferably be absent or present only in minor amount in ceramic bodies used for electrical purposes, because of the tendency of these elements to ionize under electrical stresses.

My invention is accordingly directed to providing an alkali metal free, or substantially free, insulating body, and I accomplish this end by employing in my improved ceramic body as a binding agent a previously formed multicomponent trivalent metal phosphate glass. The metal phosphate glasses are first separately prepared in the form of a finely divided powder after which they are mixed with the other crystalline constituents such as the kaoline, clay, flint or other body in suitable proportions to effect the desired bonding action, and the plastic mass molded and fired in the usual manner.

The trivalent metal phosphate glasses which I have found suitable for use as a bond in my ceramic body are based principally upon aluminum or iron metaphosphates $R(PO_3)_3$ or mixtures thereof. The pure compounds may themselves be fused and cooled to produce glasses, however because of the high melting point of these pure compounds it is desirable that other oxides or phosphates be added thereto in order to lower the melting and therefore the glass forming temperature to a point in the neighborhood of 1350° C. Other trivalent metals which may form the basis of my multicomponent glasses are, boron and chromium, however, because of cheapness I prefer to employ iron or aluminum.

Of the oxides or phosphates which I may add to aluminum or iron metaphosphate glasses, in order to lower the melting temperature to the glass working range, I have found that certain other tri- and bivalent metal compounds such as boric oxide, magnesia, magnesium metaphosphate, calcium oxide or calcium metaphosphate, barium oxide or barium metaphosphate, and aluminum oxide, fluorspar, etc., are suitable additions. Combinations of these compounds with aluminum metaphosphate in a glass produces relatively low melting points, good glass forming properties and have a desirably low dielectric constant and low dielectric loss. For example I have prepared glasses of the following composition and properties based upon phosphorus pentoxide as the principal acidic constituent:

| No. | Glass Composition | Dielectric Constant |
|---|---|---|
| 1 | $Al(PO_3)_3$ 92%; $B_2O_3$ 8% | (low) |
| 2 | $Al(PO_3)_3$ 90%; $Mg(PO_3)_2$ 2%; $B_2O_3$ 8% | 4.15 |
| 3 | $Al(PO_3)_3$ 90%; $Ba(PO_3)_1$ 2%; $B_2O_3$ 8% | 3.75 |
| 4 | $Al(PO_3)_3$ 75%; $Ca(PO_3)_2$ 20%; $B_2O_3$ 5% | 5.1 |
| 5 | $Al(PO_3)_3$ 50%; $Mg(PO_3)_2$ 50% | 5.4 |
| 6 | $Al(PO_3)_3$ 60%; $Ba(PO_3)_2$ 35%; $B_2O_3$ 5% | 5.8 |
| 7 | $SiO_2$ (glass) (for comparison) | 3.7 |
| 8 | $SiO_2$ (Quartz) (for comparison) | 4.5 |

In general, variation may be made in the above glass compositions. For example I may vary the composition of the glass No. 1 between the limits $Al(PO_3)_3=95\%$, $B_2O_3=5\%$ and $Al(PO_3)_3=88\%$, $B_2O_3=12\%$. The composition $Al(PO_3)_3=92\%$, $B_2O_3=8\%$ gives the lowest melting point (glass forming temperature) in this system.

As an example of other systems of multicomponent glasses which I have found to be usable I give the following:

No.    Glass Composition
9   $Al(PO_3)_3=65\%$, $Ca(PO_3)_2=35\%$ (which represents about the upper limit of aluminum metaphosphate possible in this combination, in order to insure easy melting)
10  $Al(PO_3)_3=90\%$, $Ca(PO_3)_2=2\%$, $B_2O_3=8\%$
11  $Al(PO_3)_3=85\%$, $KPO_3=2.5\%$, $Mg(PO_3)_2=7.5\%$, $B_2O_3=5\%$
12  $Al(PO_3)_3=60\%$, $Zn(PO_3)_2=35\%$, $B_2O_3=5\%$
13  $Al(PO_3)_3=90\%$, $Zn(PO_3)_2=2\%$, $B_2O_3=8\%$
14  $Al(PO_3)_3=57\%$, $SiO_2$ 11.4%, $P_2O_5$ 26.6%, $B_2O_3=5\%$
15  $Al(PO_3)_3=82\%$, $SiO_2$ 5.4%, $P_2O_5=12.6\%$
16  $Al(PO_3)_3=79\%$, $SiO_2$ 6.3%, $P_2O_5=14.7\%$
17  $Al(PO_3)_3=80\%$, $SiO_2$ 15.0%, $B_2O_3=5\%$
18  $Al(PO_3)_3=78\%$, $SiO_2$ 14.0%, $B_2O_3=8\%$ I may also produce suitable glasses based upon ferric metaphosphate $Fe(PO_3)_3$.

Suitable glasses based upon ferric metaphosphate may be made having the following compositions:

No.    Glass Composition
19  $Fe(PO_3)_3=96\%$, $B_2O_3=4\%$ ($B_2O_3$ may be increased up to 18% and good glasses obtained)
20  $Fe(PO_3)_3=65\%$, $SiO_2=11.5\%$, $P_2O_5$ 23.5%
21  $Fe(PO_3)_3=55\%$, $SiO_2=13.5\%$, $P_2O_5$ 31.5%

Glasses are more refractory with less $SiO_2$ and $P_2O_5$, but the following compositions still form a suitable glass:

| No. | Glass Composition |
|---|---|
| 22 | $Fe(PO_3)_3=85\%$, $SiO_2$ 5%, $P_2O_5$ 10% |
| 23 | $Fe(PO_3)_3=95\%$, $SiO_2$ 5% |
| 24 | $Fe(PO_3)_3=90\%$, $SiO_2$ 10% |

Glass may also be made using fluorspar as a flux. As examples I give:

| | |
|---|---|
| 25 | $Fe(PO_3)_3$ 98 to 96%; Fluorspar 2% to 4%, glasses up to 15% Fluorspar are clear. |
| 26 | $Al(PO_3)_3=93\%$, Fluorspar=7% |
| 27 | $Al(PO_3)_3=93\%$, Fluorspar 2%, $B_2O_3=5\%$ |

By "multicomponent phosphate glasses" as used in the specification and claims, I include those phosphate glasses which are based upon phosphoric anhydride as a principal component and which in addition contain one or more bi- or trivalent metallic elements present as the oxide or phosphate. There may also be present some quadrivalent elements such as silicon and titanium. It is also to be understood that easily ionizable elements such as the alkali metals are to be excluded to the extent and for the reasons already pointed out. These glasses are substantially water insoluble.

For producing my improved porcelain or chinaware body, I first prepare a multicomponent phosphate glass of a composition such as heretofore described which I then grind to a suitably fine state of subdivision. I then mix the finely divided glass with flint and clay in suitable proportions forming a raw batch suitable for refractory insulating bodies.

As an example I may use the following proportions:

| | Parts by weight |
|---|---|
| Flint | 50 to 60 |
| Kaolin (china clay) | 25 to 20 |
| Phosphate glass | 5 to 25 |

The flint, clay and glass mixture may then be ground in a ball mill employing flint pebbles and water and the resultant mass then filtered. The slabs of paste are removed from the filter press frames and stored until ready for use.

To produce the porcelain body the paste may be treated as in the ordinary chinaware manufacture by slip casting or it may be pressed, extruded or shaped on a wheel. It may be then fired and glazed as is usual and customary with this type of body. Upon firing the preformed phosphate glass bonds the crystalline particles of flint and clay together to produce the dense porcelain body in which the phosphate glass retains its essential glassy nature.

In place of flint and clay or even as an adjunct thereto, I may employ the crystalline mineral (or artificially produced) steatite which is obtained by firing talc or soapstone alone or a modified steatite obtained by firing talc or soapstone mixed with clay. Also included within the concept of my invention is the use of magnesium titanate which may be produced by the calcination of magnesium oxide and titanium oxide to produce compounds of the type: $MgO.TiO_2$; $2MgO.TiO_2$; $3MgO.2TiO_2$; which bodies have valuable electrical insulating properties.

What I claim is:

1. A multicomponent metaphosphate glass composed of a trivalent metal metaphosphate selected from the group consisting of $Al(PO_3)_3$ and $Fe(PO_3)_3$ together with a compound selected from the group consisting of silica and boric oxide, which is effective to lower the glass forming temperature to about 1350° C., said glass being substantially free of alkali metal compounds and containing said silica and said boric oxide in an amount equivalent to at least 5% and 4% by weight respectively.

2. A multicomponent metaphosphate glass containing at least 5% by weight of silica and from 50% to 95% by weight of a trivalent metal metaphosphate selected from the group consisting of $Al(PO_3)_3$ and $Fe(PO_3)_3$, said glass being substantially free of alkali metal compounds.

3. A metaphosphate glass containing from 55% to 100% by weight of $Fe(PO_3)_3$.

4. A multicomponent metaphosphate glass containing $Fe(PO_3)_3$ as an essential constituent together with at least one glass forming compound which is effective to lower the glass forming temperature.

5. A multicomponent metaphosphate glass containing $Fe(PO_3)_3$ as an essential constituent together with at least 5% by weight of silica which is effective to lower the glass forming temperature.

6. A multicomponent metaphosphate glass containing from 90% to 95% by weight of $Fe(PO_3)_3$, and from 10% to 5% by weight of silica.

7. A multicomponent metaphosphate glass containing 55% by weight of $Fe(PO_3)_3$, 13.5% by weight of silica and, as an additional ingredient, 31.5% by weight of $P_2O_5$.

8. A multicomponent metaphosphate glass containing 80% by weight of $Al(PO_3)_3$, 15% by weight of $SiO_2$, and 5% by weight of $B_2O_3$.

9. A phosphate glass comprising aluminum metaphosphate, $Al(PO_3)_3$, from 91% to 93% the balance being substantially all boric oxide.

10. A multicomponent metaphosphate glass containing from 88% to 95% by weight of $Al(PO_3)_3$, and from 12% to 5% by weight of $B_2O_3$.

11. A ceramic body essentially comprising refractory crystalline materials bonded together in said body by means of a relatively small proportion of a preformed metaphosphate glass, said glass being substantially free of alkali metal compounds and containing from 50% to 100% by weight of a trivalent metal metaphosphate selected from the group consisting of $Al(PO_3)_3$ and $Fe(PO_3)_3$.

12. A fired ceramic body essentially comprising refractory crystalline materials bonded together in said body by means of from about 5.6% to about 26.3% by weight of a preformed multicomponent metaphosphate glass, said glass being substantially free of alkali metal compounds and containing from 50% to 98% by weight of a trivalent metal metaphosphate selected from the group consisting of $Al(PO_3)_3$ and $Fe(PO_3)_3$.

13. A fired ceramic body essentially comprising refractory crystalline materials bonded together in said body by means of from 5.6% to 26.3% by weight of a preformed multicomponent metaphosphate glass, said glass being substantially free of alkali metal compounds and containing from 50% to 95% by weight of $Al(PO_3)_3$.

14. A fired ceramic body essentially comprising refractory materials bonded together in said body by means of from 5.6% to 26.3% by weight of a preformed multicomponent metaphosphate glass, said glass being substantially free of alkali metal compounds and containing from 50% to 98% by weight of a trivalent metal metaphosphate selected from the group consisting of $Al(PO_3)_3$ and $Fe(PO_3)_3$ together with at least one glass forming compound which is effective to lower the glass forming temperature to about 1350° C.

15. A fired ceramic body essentially comprising refractory materials bonded together in said body by means of from 5.6% to 26.3% by weight of a preformed multicomponent metaphosphate glass, said glass being substantially free of alkali metal compounds and containing from 50% to 96% by weight of a trivalent metal metaphosphate selected from the group consisting of $Al(PO_3)_3$ and $Fe(PO_3)_3$ together with at least one glass forming metal oxygen compound which is effective to lower the glass forming temperature to about 1350° C.

16. A fired ceramic body essentially comprising refractory materials bonded together in said body by means of from 5.6% to 26.3% by weight of a preformed multicomponent metaphosphate glass, said glass being substantially free of alkali metal compounds and containing from 50% to 90% by weight of a trivalent metal metaphosphate selected from the group consisting of $Al(PO_3)_3$ and $Fe(PO_3)_3$ together with a glass forming material including a bivalent metal metaphosphate selected from the group consisting of $Ca(PO_3)_2$, $Ba(PO_3)_2$, $Mg(PO_3)_2$ and $Zn(PO_3)_2$ which is effective to lower the glass forming temperature to about 1350° C.

17. A fired ceramic body essentially comprising refractory crystalline materials bonded together in said body by means of from about 5.6% to 26.3% by weight of a preformed multicomponent metaphosphate glass, said glass being substantially free of alkali metal compounds and containing from 50% to 98% by weight of $Fe(PO_3)_3$.

18. Electrical porcelain essentially comprising crystalline particles of a refractory base material bonded together by means of a relatively small proportion of a preformed multicomponent metaphosphate glass, said glass being substantially free of alkali metal compounds and containing from 50% to 98% by weight of a trivalent metal metaphosphate selected from the group consisting of $Al(PO_3)_3$ and $Fe(PO_3)_3$.

19. Electrical porcelain essentially comprising crystalline particles of a refractory base material bonded together by means of from about 5.6% to about 26.3% by weight of a preformed multicomponent metaphosphate glass, said glass being substantially free of alkali metal compounds and containing from 50% to 92% by weight of $Al(PO_3)_3$.

20. Electrical porcelain essentially comprising crystalline particles of a refractory base material bonded together by means of from 5.6% to about 26.3% by weight of a preformed multicomponent metaphosphate glass, said glass being substantially free of alkali metal compounds and containing from 50% to 98% by weight of $Fe(PO_3)_3$.

21. Electrical porcelain essentially comprising crystalline particles of silica bonded together by means of from 5.6% to 26.3% by weight of a preformed multicomponent metaphosphate glass, said glass being substantially free of alkali metal compounds and containing from 50% to 98% by weight of a trivalent metal metaphosphate selected from the group consisting of $Al(PO_3)_3$ and $Fe(PO_3)_3$.

22. Electrical porcelain essentially comprising crystalline particles of steatite bonded together by means of from 5.6% to 26.3% by weight of a preformed multicomponent metaphosphate glass, said glass being substantially free of alkali metal compounds and containing from 50% to 98% by weight of a trivalent metal metaphosphate selected from the group consisting of $Al(PO_3)_3$ and $Fe(PO_3)_3$.

23. Electrical porcelain essentially comprising particles of refractory magnesium titanate bonded together by means of from 5.6% to 26.3% by weight of a preformed multicomponent metaphosphate glass, said glass being substantially free of alkali metal compounds and containing from 50% to 98% by weight of a trivalent metal metaphosphate selected from the group consisting of $Al(PO_3)_3$ and $Fe(PO_3)_3$.

WOLDEMAR A. WEYL.

REFERENCES CITED

The following references are of record in the file of this patent:

UNITED STATES PATENTS

| Number | Name | Date |
|---|---|---|
| 1,570,202 | Buck | Jan. 19, 1926 |
| 1,601,231 | Blumenberg | Sept. 28, 1926 |
| 1,654,404 | Blumenberg | Dec. 27, 1927 |
| 1,749,823 | Long | Mar. 11, 1930 |
| 1,802,641 | Fairchild | Apr. 28, 1931 |
| 1,828,211 | Walfscholz | Oct. 20, 1931 |
| 1,830,903 | Hood | Nov. 10, 1931 |
| 1,938,674 | Terwilliger | Dec. 12, 1933 |
| 1,949,038 | Caven | Feb. 27, 1934 |
| 1,961,603 | Berger | June 5, 1934 |
| 1,964,629 | Grimm et al. | June 26, 1934 |
| 2,031,958 | Kaufmann et al. | Feb. 25, 1936 |
| 2,042,425 | Kaufmann et al. | May 26, 1936 |
| 2,077,481 | Huppert et al. | Apr. 20, 1937 |
| 2,100,391 | Grimm et al. | Nov. 30, 1937 |
| 2,194,784 | Berger | Mar. 26, 1940 |
| 2,196,974 | Boughton et al. | Apr. 16, 1940 |
| 2,218,058 | Stalhane | Oct. 15, 1940 |
| 2,226,418 | Tillyer et al. | Dec. 24, 1940 |
| 2,278,501 | Tillyer et al. | Apr. 7, 1942 |
| 2,294,844 | Gelstharp | Sept. 1, 1942 |

FOREIGN PATENTS

| Number | Country | Date |
|---|---|---|
| 445,722 | Germany | 1927 |
| 301,547 | Great Britain | 1928 |
| 2,075 | Australia | 1931 |
| 146,917 | Austria | 1936 |
| 147,460 | Austria | 1936 |
| 634,698 | Germany | 1936 |
| 636,035 | Germany | 1936 |
| 462,781 | Great Britain | 1937 |
| 60,384 | Norway | 1939 |